(12) United States Patent
Gay

(10) Patent No.: US 10,744,917 B2
(45) Date of Patent: Aug. 18, 2020

(54) OPERATOR CONTROLLED AIR SUSPENSION SEAT

(71) Applicant: Robert Leo Gay, De Pere, WI (US)

(72) Inventor: Robert Leo Gay, De Pere, WI (US)

( * ) Notice: Subject to any disclaimer, the term of this patent is extended or adjusted under 35 U.S.C. 154(b) by 66 days.

(21) Appl. No.: 15/732,111

(22) Filed: Nov. 15, 2017

(65) Prior Publication Data

US 2019/0143864 A1 May 16, 2019

(51) Int. Cl.
| | |
|---|---|
| *B60N 2/70* | (2006.01) |
| *B62J 1/12* | (2006.01) |
| *B60N 2/66* | (2006.01) |
| *B60N 2/38* | (2006.01) |
| *B62J 1/10* | (2006.01) |

(52) U.S. Cl.
CPC .............. *B60N 2/7088* (2013.01); *B60N 2/38* (2013.01); *B60N 2/665* (2015.04); *B62J 1/10* (2013.01); *B62J 1/12* (2013.01)

(58) Field of Classification Search
CPC .......... A47C 27/081; A47C 27/10; B62J 1/26; B60N 2/665

USPC .................................. 297/452.41, 284.6
See application file for complete search history.

(56) References Cited

U.S. PATENT DOCUMENTS

| | | | | |
|---|---|---|---|---|
| 3,974,827 | A * | 8/1976 | Bodeen .................. | A47C 7/467 606/237 |
| 5,121,962 | A * | 6/1992 | Weber .............. | A41D 19/01523 297/199 |
| 5,658,050 | A * | 8/1997 | Lorbiecki .................. | B62J 1/12 297/452.41 |
| 5,769,488 | A * | 6/1998 | Daniels .................. | A47C 7/021 297/199 |
| 6,125,486 | A * | 10/2000 | Rabon ...................... | A47C 4/54 5/654 |

* cited by examiner

*Primary Examiner* — Sarah B McPartlin

(57) ABSTRACT

What is new about this invention is the concept of installing these rubber types of air inflatable inner tubes in the interior of the operators' seat frame construction. These tubes would be installed beneath the operators' seating location and also the lumbar position of the frame seating area. The air filling valve locations would be placed to the rear of the seat construction frame or also could be altered due to the type of product construction being used.

1 Claim, 4 Drawing Sheets

Rear View of seat back with air valve locations.

OPERATOR CONTROLLED AIR SUSPENSION SEAT

FIELD RELATION

The present application pertains to a seat frame and interior components functioning together.

BACKGROUND

Pleasure or business activities have seating discomforts in areas such as lawn tractors and motorcycles.

I currently own & operate a small lawn care and motorcycle repair business. I had purchased a JOHN DEERE® lawn tractor several years ago for my business in which I was extremely happy with the service of the tractor. The one thing that I found was the possible improvement in the tractor seat construction. After hours of operation I found that my upper & lower back would get sore in a short amount of time. I also ride a H.D. motorcycle in which the suspension is minimal and back pain was similar to riding my lawn tractor.

After some through, with trial and error, I created a seat for my motorcycle in which the back pain was greatly diminished. Since creating the seat for my motorcycle I have adapted a version of it to my lawn tractor with a great improvement upon my physical health.

The materials used for the seating configurations are normally constructed of a metal frame with a soft material insert and a type of cloth covering. This construction is adequate but after a continuous amount of usage, it has a tendency to create a fatigability to the body.

SUMMARY

By providing this air adjustable tube type design in conjunction with an existing seat construction it should have a profound reduction of body fatigue for the operator.

BRIEF DESCRIPTION OF DRAWING/PHOTOS

In the following detailed portion of the present application there will be more of a descriptive reference to the example of relational embodiments shown in drawing and photos.

Figure 3:
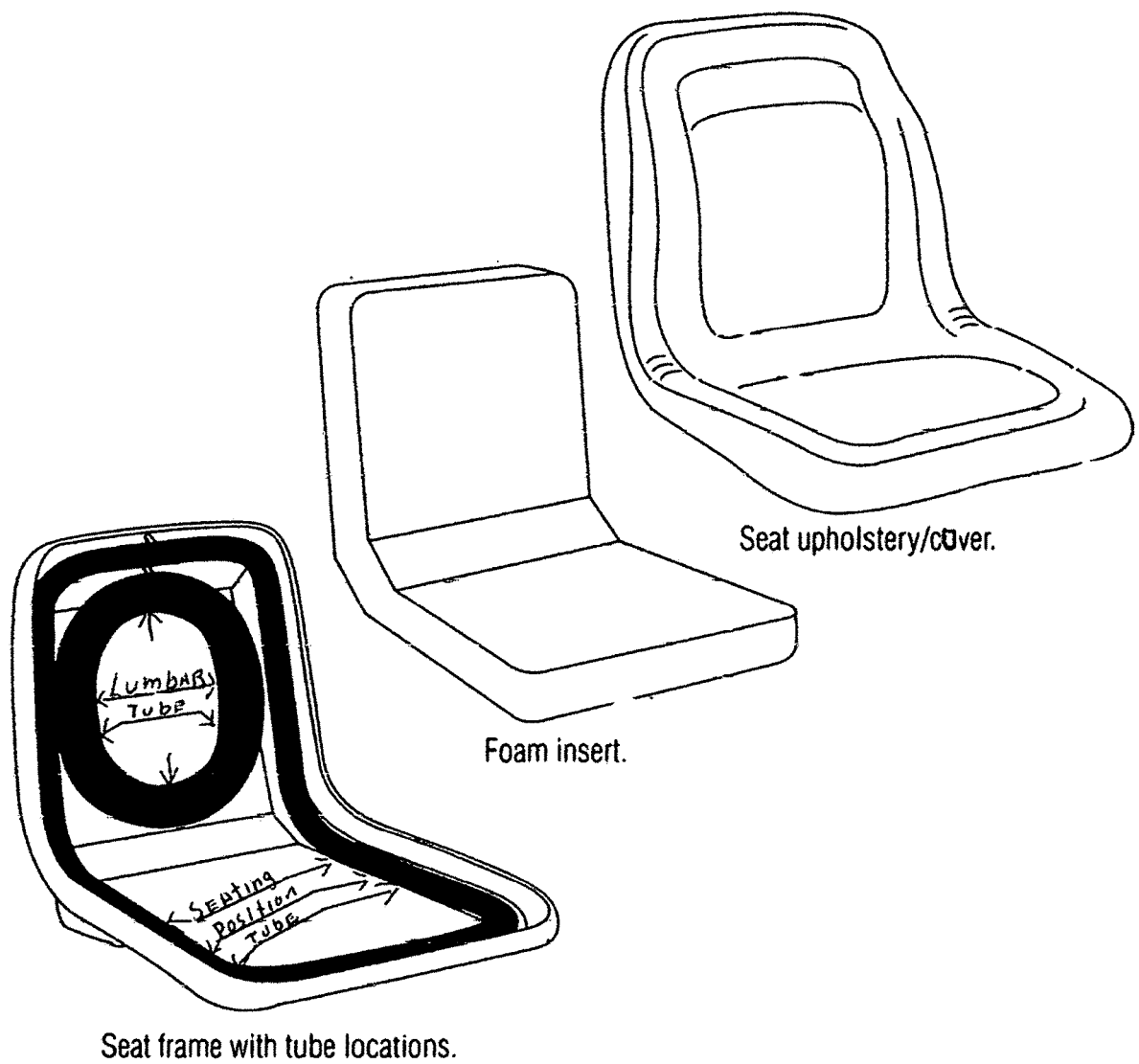

FIG. 3. is an exploded view of a tractor operator seat.

Figure 4:
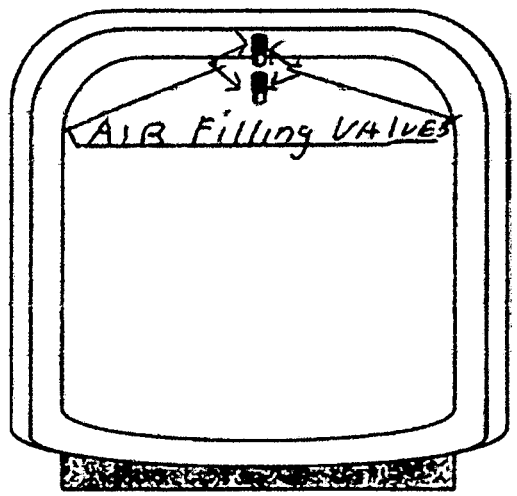

FIG. 4. is a rear view of a tractor seat back.

DETAILED DESCRIPTION OF THE INVENTION

Figure 1:
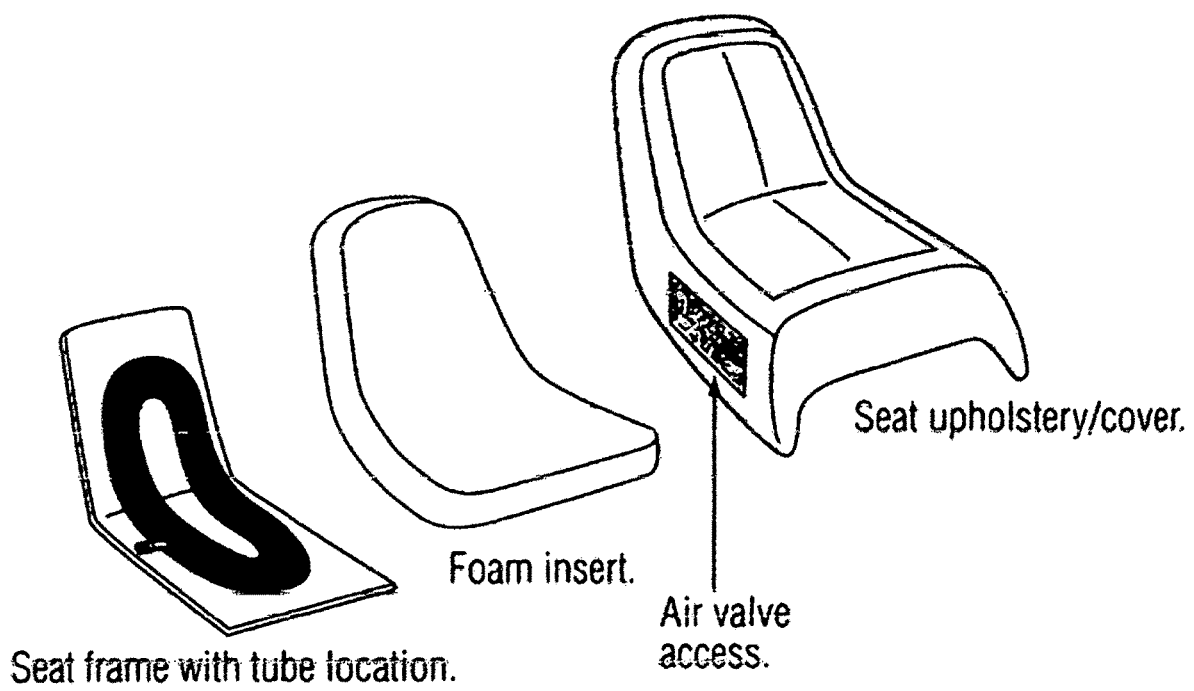
FIG. 1 is an exploded view of a passenger motorcycle seat.
Figure 2:
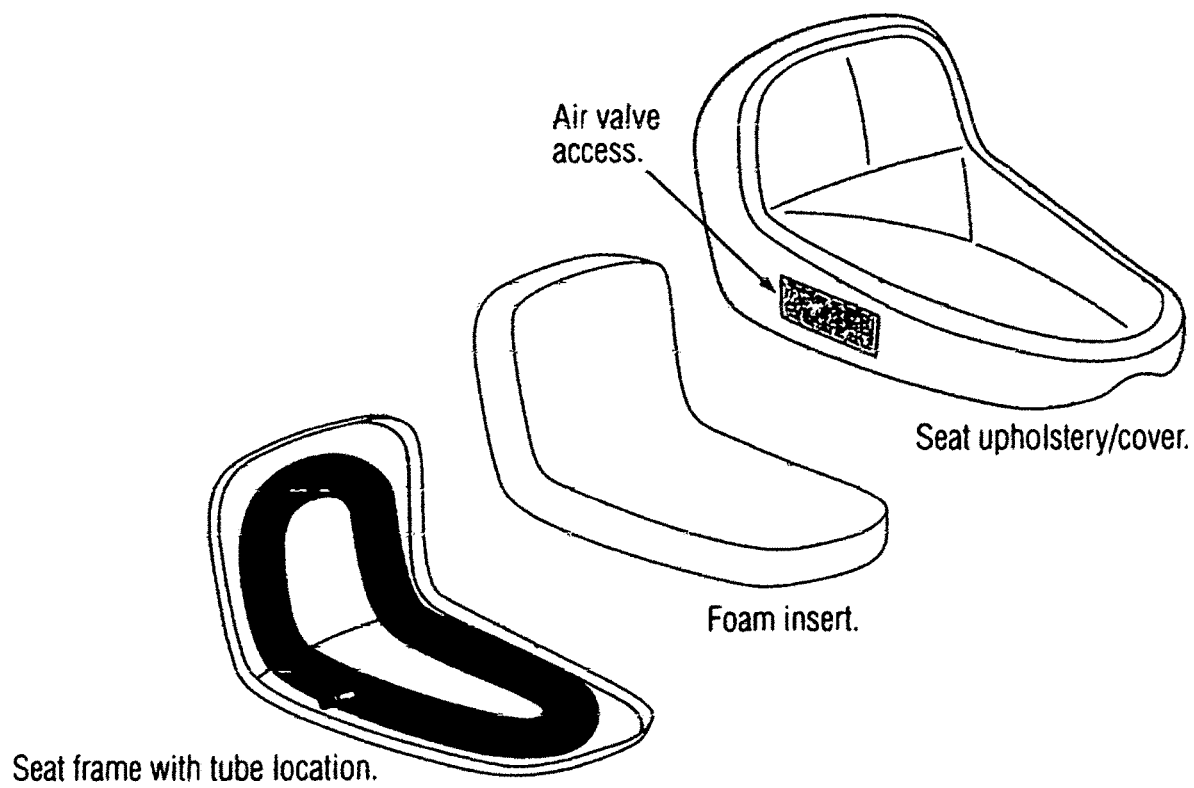
FIG. 2 is an exploded view of an operator motorcycle seat.

FIGS. 1 and 2 are exploded views of two different size motor cycle seats that have single inner tubes installed in each seat. The seats are completely recovered with the inner tubes inflated inside the seat frames. The seats each include air valve access. The air valve access includes a zippered area for accessing the adjustable air valve. The adjustable air valve is protected by the form insert and covered by the zippered air valve access.

FIG. 3 is a breakdown description of a JOHN DEERE® lawn tractor seat frame. This seat has two different type air adjustable inner tubes installed within the seat. The smaller tube is used for lumbar support, and through trial & error research, it had its best results with 10-12 psi pressure. The larger inner tube was routed along the inside outer rim of the seat, which basically held the operator comfortably inside the sitting area. This inner tube, during trial and error, and the best results with 12-14 psi air pressure.

FIG. 4 is a rear view of the seat back with the air valve locations used for filling the tubes.

The invention claimed is:

1. A vehicle seat comprising:
   a seat frame having a substantially horizontal seat portion,
      a back portion extending upward from said seat position and continuous peripheral edge extending around said seat portion and said back portion;
   a continuous seat position tube extending around the continuous peripheral edge, the continuous seat position tube including an air filling valve which extends through an aperture in the seat frame;
   a continuous lumbar tube positioned within the continuous seat position tube and within the back portion of the seat frame, the continuous lumbar tube including an air filling valve which extends through a second aperture in the seat frame;
   a foam insert positioned on top of the seat frame, the continuous seat position tube and the continuous lumbar tube;
   and a seat cover covering the foam insert.

* * * * *